US008608439B2

(12) United States Patent
Hill

(10) Patent No.: US 8,608,439 B2
(45) Date of Patent: Dec. 17, 2013

(54) SYSTEM FOR CONTROLLING OPERATION OF A CROP PROTECTION WIND MACHINE ARRAY

(76) Inventor: Daryl G. Hill, Yakima, WA (US)

( * ) Notice: Subject to any disclaimer, the term of this patent is extended or adjusted under 35 U.S.C. 154(b) by 68 days.

(21) Appl. No.: 13/337,334

(22) Filed: Dec. 27, 2011

(65) Prior Publication Data

US 2012/0093646 A1 Apr. 19, 2012

Related U.S. Application Data

(62) Division of application No. 11/805,270, filed on May 21, 2007, now Pat. No. 8,083,481.

(60) Provisional application No. 60/802,832, filed on May 22, 2006.

(51) Int. Cl.
*F03D 7/04* (2006.01)
*F03D 11/00* (2006.01)

(52) U.S. Cl.
USPC ........ 416/25; 416/1; 416/31; 416/37; 416/38; 416/39; 416/41; 416/44; 416/47; 416/61; 700/275; 700/282; 700/299; 700/300; 700/304; 702/2; 702/3; 702/45; 702/50; 702/130; 702/145; 47/2; 47/58.1 R; 455/3.02; 455/3.03; 455/427; 455/430

(58) Field of Classification Search
USPC ........ 415/1, 17, 26, 30–50, 118, 119; 416/25, 416/27–31, 33, 36–41, 44–53, 61, 120, 416/130; 700/17, 19, 275–278, 280–290, 700/299–300; 702/2, 3, 5, 45, 50, 132–136, 702/145; 47/2, 17, 88, 58.1 R; 73/170.01, 73/170.11, 170.14; 455/3.01–3.03, 455/427–430, 12.1–13.1
See application file for complete search history.

(56) References Cited

U.S. PATENT DOCUMENTS

| 3,230,667 | A | * | 1/1966 | Sinner | 47/2 |
| 3,296,739 | A | * | 1/1967 | Wiegel | 47/2 |
| 4,513,529 | A | * | 4/1985 | Reich | 47/2 |
| 5,082,177 | A | * | 1/1992 | Hill et al. | 239/77 |
| 6,237,859 | B1 | * | 5/2001 | Hill | 239/77 |
| 7,047,803 | B1 | * | 5/2006 | Hill | 73/170.01 |
| 7,412,880 | B2 | * | 8/2008 | Barreiro et al. | 73/170.07 |
| 2004/0123810 | A1 | * | 7/2004 | Lorton et al. | 119/437 |
| 2004/0130161 | A1 | * | 7/2004 | Gomar | 290/55 |
| 2007/0297892 | A1 | * | 12/2007 | Kildegaard | 415/1 |

FOREIGN PATENT DOCUMENTS

DK 2004 00053 L * 7/2005 ............ F03D 7/02

* cited by examiner

*Primary Examiner* — Christopher Verdier
(74) *Attorney, Agent, or Firm* — Svendsen Legal, LLC.

(57) ABSTRACT

A system for arranging and operating an array of wind machines to protect crops from damaging weather conditions, such as freezing frost, rain and heat. The method includes a wind machine positioned to force air across the crop. The wind machine is preferably a propeller/tower configuration. The operational method of the wind machine array includes the steps of sensing ambient meteorological and the hardiness of the crop to withstand a particular adverse weather condition and operating the wind machines in response to these factors. Multiples of wind machines are employed in the preferred embodiment of the method, the siting of the wind machines preferably based upon topographic and historical meteorological conditions. The operation of the wind machines can be automatically and remotely operated with the aid of satellite communications including internet links.

9 Claims, 5 Drawing Sheets

SYSTEM FOR CONTROLLING OPERATION OF A CROP PROTECTION WIND MACHINE ARRAY

This Divisional, Non-Provisional Utility Application claims priority under 35 U.S.C. 121, to U.S. Non-Provisional Utility patent application Ser. No. 11/805,270, filed May 21, 2007, now issued as U.S. Pat. No. 8,083,481, which was originally based upon Provisional Utility Application 60/802,832, filed May 22, 2006.

TECHNICAL FIELD

The invention relates to a method for arranging and operating an array of wind machines to disperse air. Specifically, the invention includes siting and controlling a multiple of wind machines, positioned to force air across a ground surface for the purpose of protecting crops from damaging meteorological conditions, such as freezing, excessive heat or rain water, and can include a satellite based remote monitoring and control system for the wind machines.

BACKGROUND OF THE INVENTION

The use of fans to protect crops from freezing conditions through the mixing and air movement effects of fans is well known. This "mixed air flow" technology reduces the impacts of temperature inversions near the ground surface, which greatly contribute to freezing conditions. However, this fan technology is conventionally operated by manual methods. Certain meteorological and crop related factors make the manual control of a multiple of wind machines difficult. An automated system is needed that responds to the natural meteorological conditions, such as wind, temperature and humidity, in the operational control of an array of wind machines.

U.S. Pat. No. 4,513,529 discloses a method for preventing frost damage to crops that includes a suggestion of placing an array of ground-level temperature sensors in an orange grove to detect the need for freeze protection. This approach is rudimentary, and only addresses temperature, with the use of pole mounted lights to indicate the need for air movement action by use of a helicopter. A system is needed that improves upon such a sensor system, to somehow operate frost protection automatically, with surface wind machines, as opposed to manually controlled aircraft.

The invention will be better understood by reference to the following detailed description taken in conjunction with the accompanying drawings.

DETAILED DESCRIPTION OF SPECIFIC EMBODIMENTS

Figure 1:
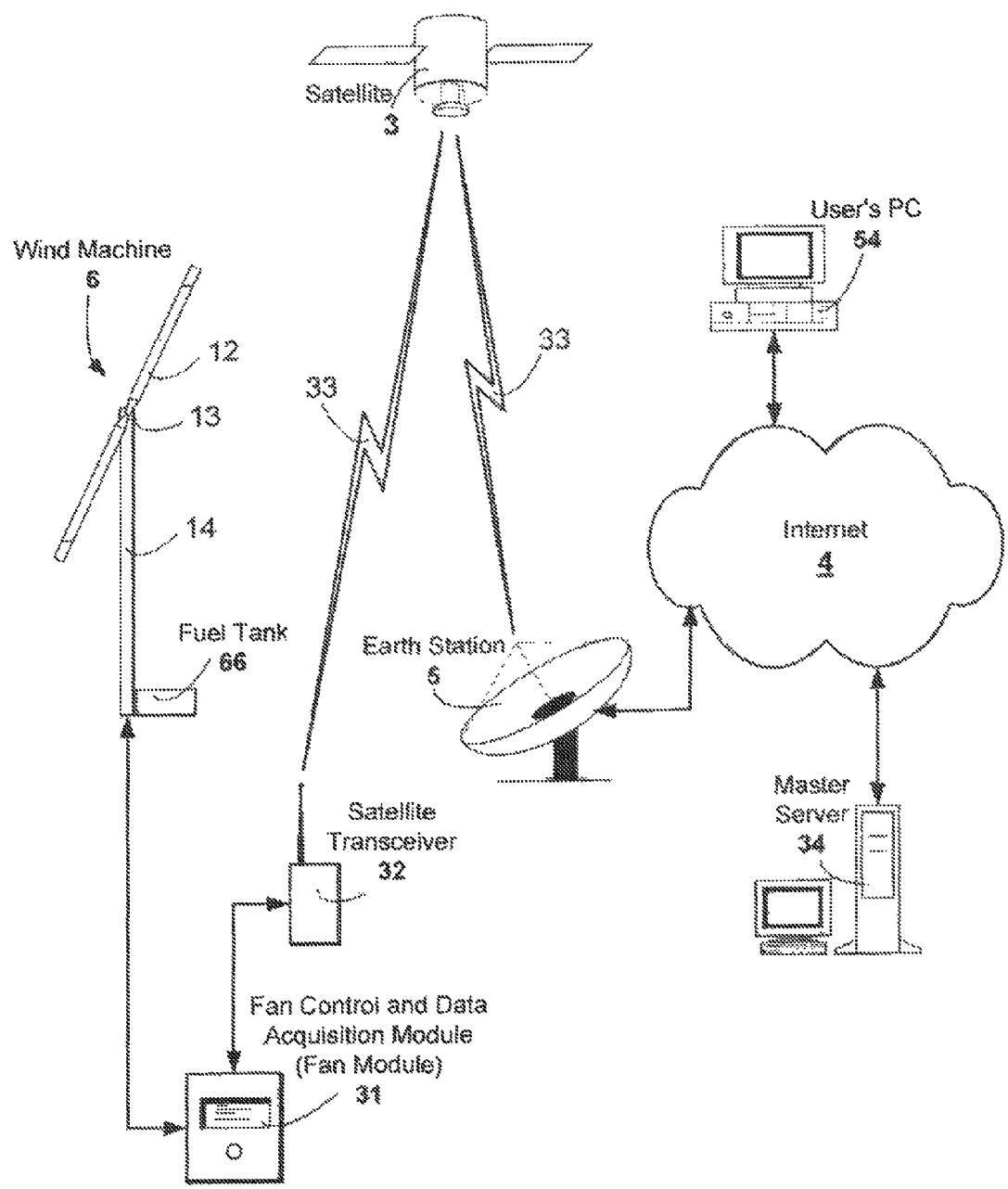
FIG. 1 is a schematic chart of elements of an intelligent wind machine operating system for siting and operating a crop protection wind machine array, according to an embodiment of the invention.

The invention provides an operational method for a wind machine array, and more particularly a remote, and intelligent system for siting and operating a crop protection wind machine array operation that protects crops from damaging meteorological conditions, such as frost damage. Other weather related crop damage is also considered within the scope of the present invention. High heat conditions can be moderated with the use of powered fans sited near affected crops. Rain can also be dispersed and crops dried with the same powered fans. The present specification is primarily directed to freezing conditions that affect fruit and frost conditions that affect flowering crops and fruit buds. The term "freezing" is employed herein as interchangeable with the term "frost," although the two terms may have different meaning to those skilled in this field. For the purpose of the present specification, the terms freezing and frost both describe adverse meteorological conditions, attributable to cold weather, with the potential to affect any portion of a cultivated plant, including the fruit, buds, flowers or leaves.

The system and operational method of the present invention enable a user 53 to automatically operate and control a wind machine 6, as part of a wind machine array 7. In a preferred embodiment, a communications satellite 3 and the internet 4, are utilized to facilitate this automatic control and operation, most preferably with the aid of an earth station 5. Additional preferred elements included in a wind machine operational system 11, and an operational method 17, are shown in FIGS. 1 through 5.

Figure 2:
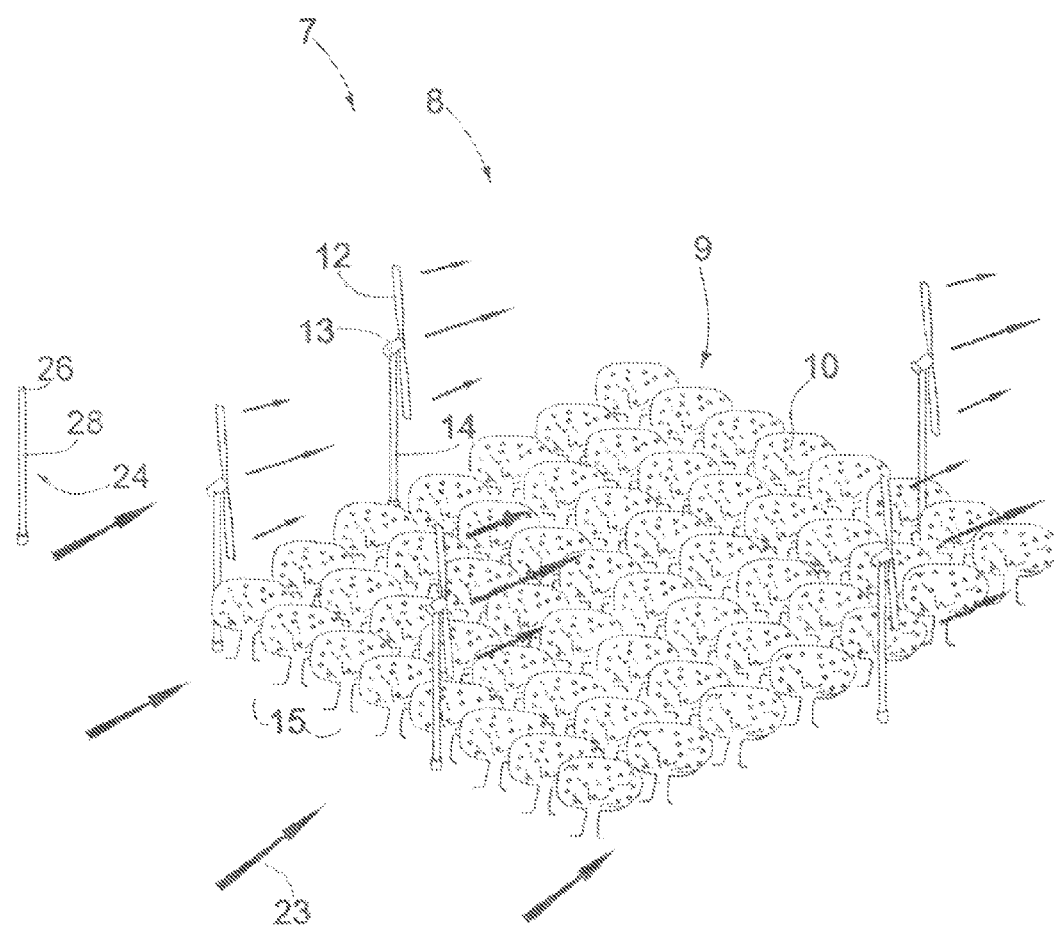
FIG. 2 is a perspective view of a crop protection wind machine array, according to an embodiment of the invention.
Figure 3:
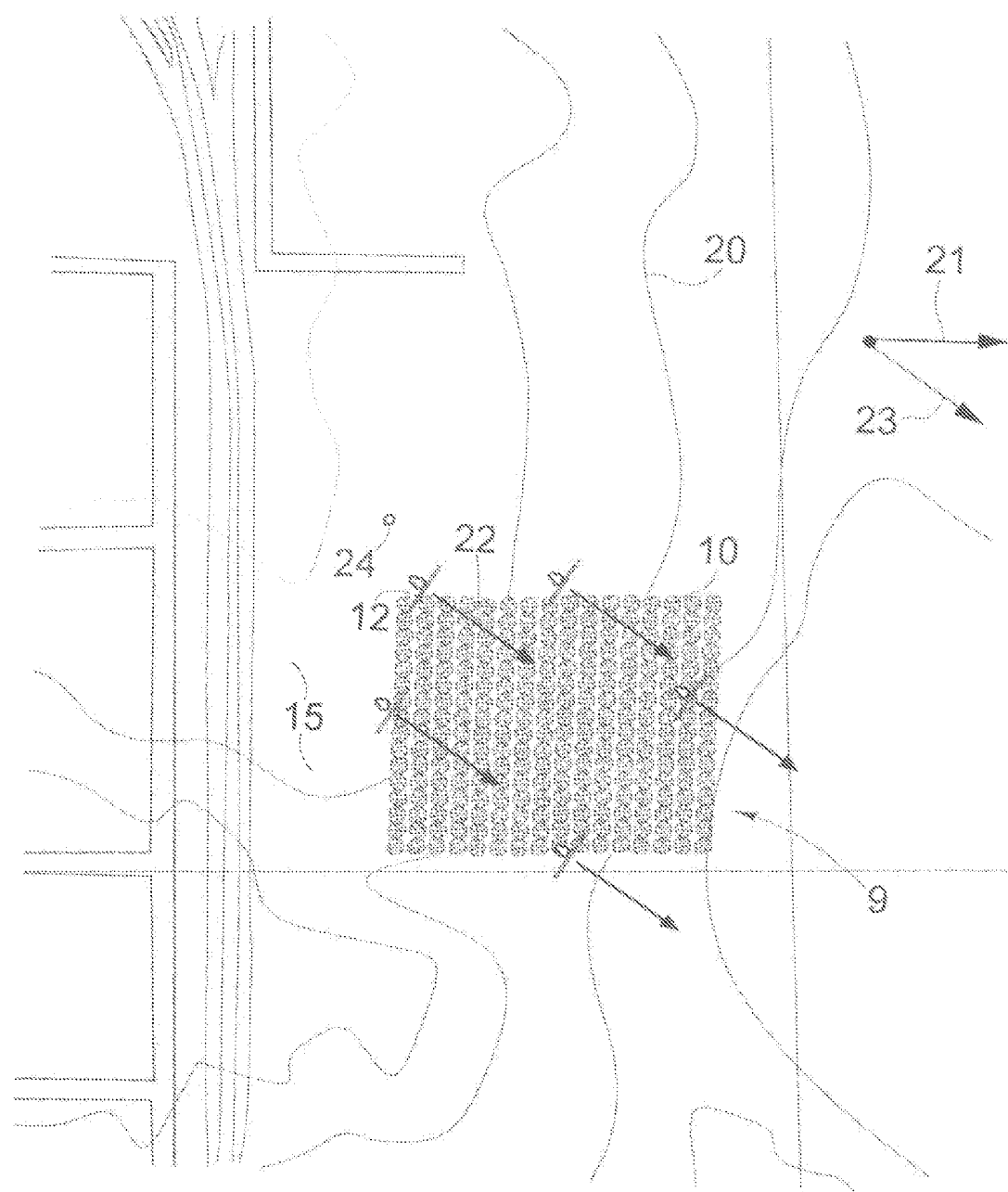
FIG. 3 is a mapped, plan view of a crop protection wind machine array, according to an embodiment of the invention.

FIGS. 2 and 3 shows the wind machine array 7, the wind machine array composed of a multiple of wind machines 8, positioned about a crop 9. The crop is most preferably a tree crop, in the form of an orchard 10, which is broadly defined for the present disclosure as any typical farm, vineyard, grove, ranch, or conventional planting. The operation of each wind machine in the wind machine array is controlled, as further discussed herein, to function together in concert, co-ordinated with all of the wind machines in the array, to optimize the crop protecting effects of the wind machine array. As shown in FIG. 1, each wind machine 6, of the multiple of wind machines preferably includes a propeller 12 mounted to a motor 13. The motor preferably mounts upon a tower 14, and the tower is planted most preferably into a ground surface 15.

Figure 4:
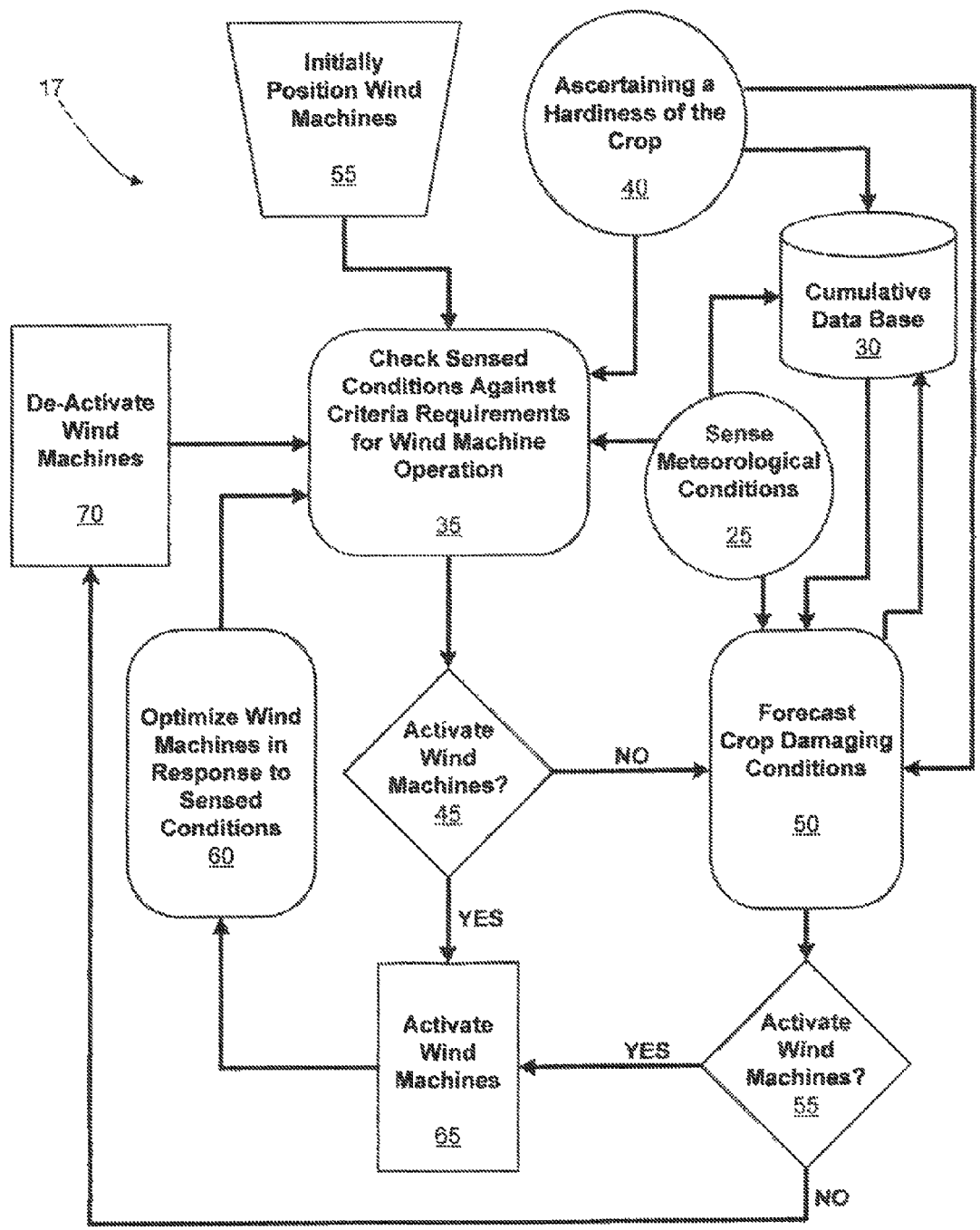
FIG. 4 is a logic flowchart of a method for siting and operating a crop protection wind machine array, according to an embodiment of the invention.

FIG. 4 schematically overviews the method of operation 17 of the multiple of wind machines 8 in the wind machine array 7, according to a preferred embodiment of the present invention. The method of operation first includes an initial positioning of the multiple of wind machines, proximate to the crop 9. This initial positioning of the multiple of wind machines may also be referred to as a "siting step."

The crop 9 is surrounded by topography. Conventionally, topography can be described from the plan or overhead view with the use of a contour 20, as shown the map view of FIG. 3. The contour is a line or curve of constant elevation. For the frost or freezing protection embodiment of the wind machine operational system 11, the siting step includes a review of these topographic contours and mapped features. FIG. 3 also shows a downhill slope direction 21. It is known to those skilled in meteorology that in the absence of intervening frontal flow, especially in calm atmospheric conditions, cooler air typically seeks lower elevations and its flow will follow the downhill slope direction. The multiple of wind machines 8 are preferably positioned to take advantage of this "downslope flow," so that the air flow induced by the wind machine is enhanced, rather than hampered or possibly canceled by this natural movement of air. As evident in FIG. 3, the downhill slope direction or downslope flow direction, is determined by the simple construction of a perpendicular to the contours, in the direction of decreasing elevation trend. The wind machines each include a direction of generated wind flow 22. The wind machine's direction is preferably parallel to the downhill slope direction to take advantage of this natural flow.

A predominant wind direction 23, as also shown in FIG. 3, is another factor that is preferably considered in the siting step 18, for the multiple of wind machines 8. To determine the predominant wind direction for a particular site under varied conditions, a meteorological telemetry station 24 is preferably utilized. The meteorological telemetry station, can be located above the ground surface 15, on a "met" tower 28, which is a standard meteorological instrument mounting tower, as shown in FIG. 2. Typically proximate the top of the tower, a meteorological sensor 26 is installed. At a minimum, the telemetered data transmitted from the telemetry station, as sensed by the meteorological sensor, most preferably includes surface wind direction, wind speed and temperature, all monitored at regular intervals. Also alternatively, one of the towers 14 of the multiple of wind machines 8 can be utilized for the meteorological telemetry station. However, when the meteorological telemetry station is incorporated within one of the wind machine towers, the telemetered data can be obscured when the wind machine is in operation. When used, as preferred, the separate, stand alone met tower can also be employed to monitor the weather parameters near the height of the wind machines. A wind direction, wind speed and temperature telemetry, in real time, aids in the siting of the multiple wind machines. These weather parameters are helpful to track and take advantage of predominant wind directions, especially during stagnant periods, so that the air flow induced by the wind machine is enhanced, rather than countered or possibly canceled by these natural wind and air flows.

Additionally, as a recommended part of the initial siting step 18, the multiple of wind machines 8 are selected to provide the highest volume of airflow, at the lowest fuel consumption and lowest operational noise levels. The "Agri-Cool™" wind machine with a propeller 12 having "high volume" characteristics, as manufactured by Orchard Rite, LTD. of Yakima Wash., USA, is a preferred wind machine selection.

FIG. 1 shows the relationship between the several components of the wind machine operational system 11, for siting and operating the crop protecting wind machine array 7. A wind machine data logger, similar in function with the meteorology data logger 27, are preferably operated with a satellite transceiver 32, to communicate to the satellite 3, which then relays a broadcasted datastream 33 through the earth station 5. The earth station is a conventional gateway for linking the satellite to the Internet 4. Earth stations are widely distributed around the planet and act as ground-based receivers and transmitters for internet traffic. Preferably, a master server 34 is operated by a system administrator 53, to oversee and coordinate the wind machine operational system 11. The master server can host a web-based interface for access by each individual user 53 of the operational system.

The wind machine data logger is preferably a digital acquisition module or "DAQ," for the digital acquisition and translation into computer readable form, of digital and analog signals from sensors and electronic outputs related to each of the multiple of wind machines 8. As an example, the DAQ module can be used to read a voltage signal coming from the fuel gauge. The module then passes the signal to the satellite transceiver to be forwarded to the end user.

Most preferably, the wind machine data logger or alternatively the digital acquisition module, also include remote control capabilities, to operate the wind machine 6 through the interface with the satellite transceiver 32, in the form of a fan control and digital acquisition module 31C. The wind machine data logger, the digital acquisition module, and the fan control and digital acquisition module are interchangeably referred to herein as a fan module 31. A preferred fan module for use as the wind machine data logger is the AutoStart™ brand of fan module, as manufactured by Orchard Rite, LTD. of Yakima Wash., USA. Most data handled by the wind machine data logger component of the fan module flows out from the satellite transceiver to the web server, where it is processed and updated to the web-site for access by the user 53, most preferably with the aid of a user's PC 54, but alternatively with any conventional data processing web-enabled device.

Most preferably, the satellite transceiver 32 is a conventional radio device about the size of a cell-phone, with an attached antenna, that is mounted to each wind machine 6. The satellite transceiver behaves similarly to a standard PC type of modem, as it performs both data receiving and transmitting tasks. The transceiver connects to the fan module 31C, and will communicate with it regularly. Its primary function is sending information from the fan modules back to the user's PC 54 and forwarding commands generated by the user's PC and the master server 34 to the fan module.

In a preferred embodiment, the satellite transceiver 32 reads data from the fan control and data acquisition module, or fan module 31C, all values pertaining to the operation of the wind machine 6, its motor 13 and fan 12, including: wind machine start temperature, fan RPM, fan orientation, fan blade pitch, sensed ambient temperature, motor temperature, fuel levels sensed wind direction, sensed and wet bulb temperature, for example. Fuel levels may be sensed by placing a fuel level sensor to a fuel tank 66 of the wind machine 6.

The satellite transceiver 32 establishes a connection with the overhead satellite 3 and passes data to it by way of the broadcasted datastream 33. The satellite relays this data to the earth station 5. These earth stations are standard terrestrial gateways, positioned around the world and act as uplinks and downlinks to the Internet 4, designed to receive and forward data to and from all users 53. When the master server 34 receives the datastream, originally generated from the fan module 31C, it processes the data stream and makes it available to the end user, again via the Internet.

In a preferred operational method 17 of the wind machine array 7, the meteorological telemetry station 24 is employed in a sensing of a real time ambient meteorological condition 25. As discussed above, the meteorological telemetry station includes the meteorological sensor 26, which is in communication with a meteorological or meteorology data logger 27. Most preferably, the meteorological sensor is mounted on the met tower 28, or alternatively, one of the multiple of wind machines 8, while the meteorological data logger is mounted nearby, within a waterproof enclosure that is easily accessible. The meteorology sensor preferably includes a wind speed sensor and wind direction indicator, or anemometer, and an air temperature sensor, and an air moisture humidity sensor or hydrometer. The selection and configuration of these meteorological sensors are well known to persons skilled in the remote site automated gathering of meteorological data.

As most preferred, the meteorological sensor 26 transmits a low voltage signal for each sensed parameter to the meteorology data logger 27. The meteorology data logger, well known to those skilled in the field of weather monitoring and telemetry, organizes and temporarily stores the data acquired from the meteorological sensor specific, and relays this time tracked data to the wind machine operational system 11, preferably employing the data acquisition module 31 or the fan module 31C, as discussed above. The wind machine operational system then uses the telemetered information and archives it in a cumulative data base 30, preferably with the master server 34.

Similar to the meteorology data logger 27, a wind machine data logger 31 is preferably employed to monitor the operational parameters of each of the multiple of wind machines 8 in the wind machine array 7. Each wind machine preferably includes sensors that provide for the transmission of low voltage signals for each sensed parameter to the wind machine data logger. Acquired telemetry preferably includes the direction of the wind machine, rotational speed, maintenance or mechanical alarms, and propeller trim and speed. The wind machine data logger, also well known to those skilled in the field of mechanical device monitoring and telemetry, organizes and temporarily stores the data acquired from the wind machines, and relays this time tracked data to the wind machine operational system 11. The operational system then uses the telemetered information and archives it in the cumulative data base 30.

Figure 5:
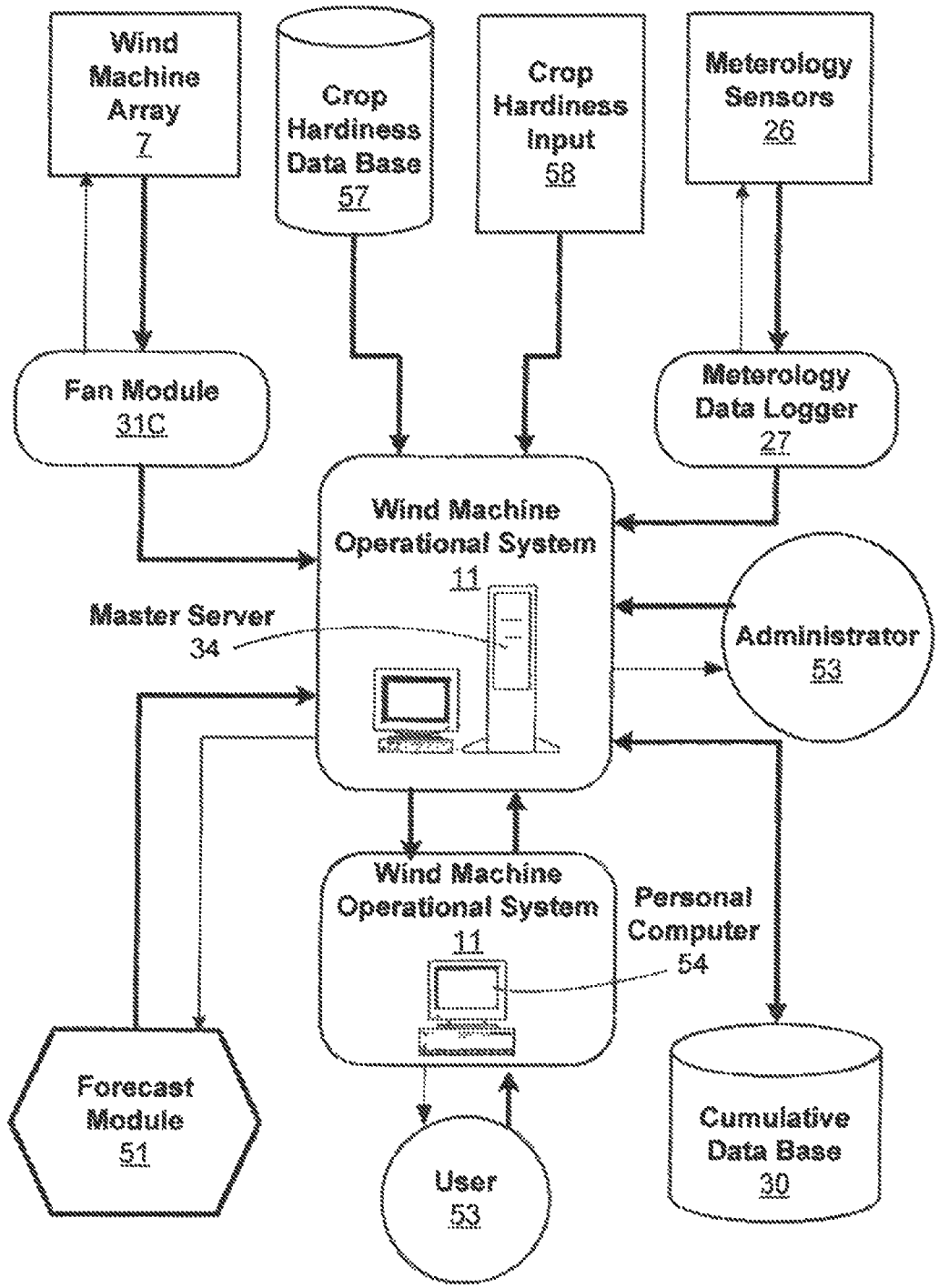
FIG. 5 is a schematic chart of the elements of an intelligent wind machine operating system for siting and operating a crop protection wind machine array, according to an embodiment of the invention.

The cumulative data base 30 preferably provides an archive for all meteorological and wind machine operation information for use by the wind machine operational system 11. The operational system is preferably run on the master server 34, as shown in FIG. 5. The operational system most preferably includes a relational architecture, which provides access to the archived information through specifically formatted queries and data mining techniques, well known to data processing professionals.

The wind machine operational system 11 has four primary tasks. Two of these tasks relate to the activation of the wind machine array 9. The operational system checks sensed conditions against criteria requirements for wind machine operation 35, as shown in FIG. 4. From an ascertaining the hardiness of the crop 40 and the sensing of meteorological conditions 25, the operational system can make a decision whether to activate wind machines 45. If specific crop hardiness criteria are met and specific meteorological conditions are satisfied, the decision can be made to activate the wind machines 65. The monitored crop hardiness criteria, simply referred to herein as "hardiness," is a valuable input in the decision to activate the wind machines, and include the susceptibility of the crop to damage by adverse meteorological conditions, such as freezing temperatures. For cold weather protections, as encountered with freezing or frost producing conditions, the sensed meteorological conditions considered in the decision to activate of the wind machine array, include low wind speed with a corresponding drop in ambient temperature. Wind direction may also be an important factor. The direction of sensitive receptors off site, and the natural downslope airflow can be considered by the operational system.

For effective response to sensed changes in plant operation and meteorological conditions, the initiation or siting of the wind machine array 7 is preferably accomplished as discussed above, with an initial positioning of the wind machines 55, which includes a review of the topographic contours 20 and mapped features. Again, the multiple of wind machines 8 are preferably positioned to take advantage of the "downslope flow," in additional consideration of the historic meteorological trends and patterns for the crop 9. As shown in FIG. 4, the initial positioning of the wind machines is a critical first step to the operation of the wind machines in that this initial position factors into the decisions made by the operation method 17 in monitoring and then in operating the wind machine array. The cumulative data base 30, as shown in FIGS. 4 and 5, is preferably employed for the compilation of the historic and the archival storage of real-time telemetered meteorological data, as discussed above.

Additionally, the wind machine operational system 11 includes a predictive or forecasting component for activating the wind machines "pro-actively," in response to imminent damage producing conditions, before freeze damage becomes a problem. The ascertaining of crop hardiness 40, most preferably updated at any given instance, is employed to check sensed provide criteria for the forecasting of crop damaging conditions 50. For a preferred embodiment of the present invention, crop hardiness is also monitored. As shown in FIG. 5, a crop hardiness database 57 can be utilized to aid in the ascertaining of crop hardiness 40. The information contained in the crop hardiness database is critical to the automated decisions regarding the operation of the wind machine array in that factors, such as the temperature and dew point coupled with the growth stage of the crop and its historical tolerance to similar crop damaging conditions, are important in making such operational decisions. Additional information on crop hardiness input 58 is a manual override of estimated crop hardiness, or alternatively supplementary information, if the latest hardiness information is, for instance a few days old, or somehow unreliable. The crop hardiness database is most preferably an automated "lookup table" that calculates the amount of damage likely to occur at a given temperature, based upon the growth stage of the crop, such as freeze damage to buds at a particular stage of growth. The historical data is also archived, to modify the damage estimate. Manual inputs might include the latest information from a standard, calibrated temperature-controlled chamber, to test an actual cutting from the orchard 11, for a true assessment of crop hardiness.

In alternative embodiments of the present invention, the crop hardiness can be rain hardiness, or how much moisture the crop can tolerate under the present or immediately forecasted weather conditions, to dictate at what point the wind machine array should be activated. Also alternatively, the crop hardiness may be tolerance to high temperatures, in which case the wind machines would be activated upon a predetermined temperature or immediately forecasted weather condition that would otherwise damage the crop due to high heat impacts.

The data amassed from the meteorological telemetry station 24 can be reviewed by a predictive program to forecast a crop damaging condition 50. The predictive program may be referred to as a forecast module 51, as shown in FIG. 5. The forecast module of the predictive program is most preferably embodied within the wind machine operational system 33, preferably located in the master server 34, and operated by an administrator 53. The forecast module application, employing simple, monitoring and predictive algorithms, as are well known to those skilled in the art of data management in industrial settings for predictive operational functions. The PC including remote components of the operational system is interactively accessed by a user 53, located at the PC itself or located remotely, and communicating over the internet, or another appropriate network or communication system. The wind machine array 7 is activated by the operational system if certain, preprogrammed values or criterial criteria are met. These criteria may be any combination sensed variables, such as air temperature, wind speed, plant hardiness criteria, time of day, wind direction, and dew point. Trends in any of these criteria or variables can also be tracked, as with a data analysis program within the wind machine operational system 11 and "mines the cumulative data base 30. This data analysis preferably employs pattern recognition features, as known to those skilled in data analysis using automated methods. An intelligent, learning supervisory control and data acquisition system is most preferred, as also known to those skilled in the field of automated data tracking and analysis. With the data analysis program, the occurrence of crop damaging conditions is forecasted when the sensed meteorological conditions 25, coupled with the ascertaining of the hardiness of the crop 40, points to frost damaging conditions.

After the wind machine operational system 11 activates the wind machines 65, the third primary task is preferably undertaken by the operational system includes optimizing the wind machines in response to sensed conditions 60. The meteorological telemetry station 24, which includes the meteorology sensors 26 is employed to provide for the sensing if meteorological conditions 25, which is employed to optimize the wind machines in response to the sensed conditions 60. Not only can this optimization include orienting the multiple of wind machines 8 in response to the real time ambient meteorological condition as sensed, but also in response to the hardiness of the crop to freezing conditions, as ascertained by manual input or calculated internally by the wind machine operational system 33.

Improved frost control strategies are realized with the operational method 17 of the wind machine array 7, with the benefit of archiving all data being received from the wind machine. This data within the cumulative data base 30 can be analyzed to reveal trends and fine tune frost control strategies. This data is preferably augmented with data from local weather stations. The present method is an excellent tool for establishing weather patterns and exposing micro-climates within the orchard 10, grove or ranch.

After the wind machine array 7 has been in operation for a period of time, the operational method 12 of the present invention can additionally include de-activating the multiple of wind machines 70. As preferred, the de-activated state is the default or rest condition of the wind machine array, and the multiple of wind machines 8 are de-activated when the monitored criteria no longer meet the requirements for activation, and there is no longer the forecast of crop damaging conditions 50. After the wind machines are de-activated, the wind machine operational system 11 reverts to a monitoring and forecasting mode, as regularly updated and the check of sensed conditions against criterial requirements 35 and the forecast of crop damaging conditions persists.

In an additional alternative embodiment of the present invention, the operation of the wind machine array 7 can include the operation of a subset of the multiple of wind machines 8. This subset may be any number of the wind machines of the wind machine array, as determined to be adequate under the sensed conditions to meet the system's frost protection requirements.

Additionally, the multiple of wind machines 8 have operational parameters, which can be optimized for the best performance of each wind machine 6. In an additional, alternative embodiment of the present invention, the operational method 12 of the wind machine array 7 can include varying the operation parameters of each wind machine in response to the sensed conditions, to affect the optimum in frost prevention and control. The operational parameters include wind machine orientation or air flow direction, speed of propeller rotation, and propeller blade pitch. Changes in these operational parameters results in changes in operational characteristics of any or all of the wind machines.

For example, if the operational system 11 determines that the sensed meteorological conditions require wind machine activation, but there is some air movement, the optimization of the wind machines in response to sensed conditions 60. May reduce the rotational speed of the propellers 12, to economically provide for a minimal, adequate freeze protection. Lower fan or propeller speed is desirable because at lower propeller speeds, less energy is consumed and less noise is produced by operation of the wind machine 6. Alternatively, propeller pitch can also be adjusted with some types of wind machine propellers. Pitch can be adjusted in a tradeoff between efficiency and noise at a particular propeller speed. Residential neighborhoods are sensitive to fan noise, especially late at night and in early morning hours. Municipal noise ordinances, codes and operational agreements with these neighbors may require that certain maximum noise levels be observed and so limit the operational noise levels of the wind machine array 7.

The user 53 also can benefit from increased control of wind machine array 7, because the criteria for activating the wind machine can be monitored and modified, changed remotely or overridden and at a moments notice. This ensures each wind machine 6 is running only when needed and provides increased frost protection, fuel savings and decreased wear and tear on the wind machine array. The improved fuel level awareness and management of fuel levels offered by the wind machine operational system 11 is a great benefit to users. The operational system supports remote fuel level monitoring and can be configured to warn the user when there is a low fuel condition at any wind machine. The system can also initiate a controlled shut down of any wind machine should fuel level become extremely low. This protects the engine 13 and driveline from damage or catastrophic mechanical failure. Again, all potentially vital operational variables for the wind machines, such as fan motor temperature, air temperature, RPM and battery voltage may be monitored at each fan. With the user's PC 54 or other web-enabled device, the user may view or change the status of any wind machine.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above, for instance in the application to crop drying and crop cooling systems and methods. Therefore, the invention is not to be limited except by the following claims, as appropriately interpreted in accordance with the doctrine of equivalents.

The following is claimed:

1. A control system for wind machine operation including:
   a multiple of wind machines positioned proximate to a crop;
   the multiple of wind machines each interfaced with a satellite transceiver through a fan module, the satellite transceiver linked to an earth station having an internet connection;
   a computer based wind machine operational system accessible by an individual user of the control system, the computer based wind machine operational system also having the internet connection;

the multiple of wind machines operable by action of the computer based wind machine operational system; and the multiple of wind machines are operable by action of the computer based wind machine operational system in response to the freeze hardiness of the crop.

2. The control system of claim 1, wherein:

the multiple of wind machines are operable by action of the computer based wind machine operational system in response to a forecast module for predicting damage producing conditions in relation to the crop.

3. The control system of claim 1, wherein:

the computer based wind machine operational system checks a sensed condition against a stored criteria for wind machine operation.

4. The control system of claim 1, wherein:

the multiple of wind machines are operable by action of the computer based wind machine operational system in response to a real time ambient meteorological condition, as sensed by a meteorological telemetry station, the meteorological telemetry station located proximate to the crop.

5. A control system for wind machine operation including:

a multiple of wind machines positioned proximate to a crop;

a meteorological telemetry station located proximate to the crop, the meteorological telemetry station for sensing a real time ambient meteorological condition;

the multiple of wind machines having an interface with a satellite transceiver through a fan module, the satellite transceiver linked through a satellite to an earth station having an internet connection;

a computer based wind machine operational system accessible by an individual user of the control system, the computer based wind machine operational system also having the internet connection;

the multiple of wind machines operable by action of the computer based wind machine operational system, in response to the real time ambient meteorological condition, as sensed by the meteorological telemetry station; and the multiple of wind machines operable by action of the computer based wind machine operational system;

the multiple of wind machines are operable by action of the computer based wind machine operational system in response to the freeze hardiness of the crop.

6. The control system of claim 5, wherein:

a data base is accessed by the computer based wind machine operational system to ascertain the freeze hardiness of the crop.

7. The control system of claim 5, wherein:

the computer based wind machine operational system accesses and analyzes a data base in the operation of the multiple of wind machines; and an automated data analysis employing pattern recognition features is used to analyze the data base.

8. The control system of claim 5, wherein:

the computer based wind machine operational system checks a sensed condition against a stored criteria for wind machine operation.

9. The control system of claim 8, wherein:

the sensed condition is a real time ambient meteorological condition.

* * * * *